United States Patent
Thammineni et al.

(10) Patent No.: US 12,227,231 B2
(45) Date of Patent: Feb. 18, 2025

(54) AIR GUIDES FOR VEHICLES

(71) Applicant: Toyota Motor Engineering & Manufacturing North America Inc., Plano, TX (US)

(72) Inventors: Ravindranath Thammineni, Northville, MI (US); Hayato Shimuzu, Ann Arbor, MI (US); Brent Cetnar, Livonia, MI (US); Mauricio Martinez, II, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 399 days.

(21) Appl. No.: 17/713,911

(22) Filed: Apr. 5, 2022

(65) Prior Publication Data

US 2023/0312027 A1  Oct. 5, 2023

(51) Int. Cl.
| | |
|---|---|
| *B62D 35/00* | (2006.01) |
| *B62D 25/08* | (2006.01) |
| *B62D 25/16* | (2006.01) |
| *B62D 25/18* | (2006.01) |
| *B62D 37/02* | (2006.01) |

(52) U.S. Cl.
CPC ......... *B62D 35/008* (2013.01); *B62D 25/161* (2013.01); *B62D 25/182* (2013.01); *B62D 25/082* (2013.01); *B62D 25/084* (2013.01); *B62D 37/02* (2013.01)

(58) Field of Classification Search
CPC .... B62D 25/08; B62D 25/082; B62D 25/084; B62D 25/085

USPC .... 296/180.1, 180.5, 187.09, 193.09, 203.02
See application file for complete search history.

(56) References Cited

U.S. PATENT DOCUMENTS

| | | | |
|---|---|---|---|
| 4,671,555 A | 6/1987 | Linz et al. | |
| 6,227,321 B1* | 5/2001 | Frascaroli | B60K 11/04 296/203.02 |
| 6,357,821 B1* | 3/2002 | Maj | B60Q 1/0035 296/203.02 |
| 8,449,021 B2* | 5/2013 | Mana | B60R 19/18 293/120 |
| 9,469,355 B2 | 10/2016 | Wolf | |
| 9,802,658 B2 | 10/2017 | Wolf | |
| 10,981,610 B2 | 4/2021 | Guyon | |
| 2002/0079716 A1* | 6/2002 | Espinose | B60J 1/20 296/95.1 |
| 2014/0159429 A1* | 6/2014 | Chung | B62D 25/085 296/193.09 |
| 2016/0096558 A1* | 4/2016 | Bassily | B62D 35/02 296/180.4 |

(Continued)

FOREIGN PATENT DOCUMENTS

| | | |
|---|---|---|
| CN | 209923752 U | 1/2020 |
| KR | 101116771 B1 | 2/2012 |

*Primary Examiner* — Gregory A Blankenship
(74) *Attorney, Agent, or Firm* — Dinsmore & Shohl LLP

(57) ABSTRACT

An air guide for a vehicle having a pair of side members. The air guide includes a base member having a pair of opposing ends and a pair of attachment members configured to be coupled to the pair of side members. Each of the pair of attachment members are coupled to a respective opposing end of the base member for movement between a folded position, an unfolded position, and an attachment position between the folded position and the unfolded position.

19 Claims, 4 Drawing Sheets

(56) References Cited

U.S. PATENT DOCUMENTS

| | | | |
|---|---|---|---|
| 2018/0362101 A1* | 12/2018 | Virdie | B62D 35/007 |
| 2020/0283077 A1* | 9/2020 | Burrows | B62D 35/001 |
| 2020/0377159 A1* | 12/2020 | Bossons | B62D 35/007 |
| 2022/0135150 A1* | 5/2022 | Lindberg | B62D 37/02 |
| | | | 296/180.1 |
| 2023/0159114 A1* | 5/2023 | Metka | B62D 37/02 |
| | | | 296/180.5 |
| 2023/0312027 A1* | 10/2023 | Thammineni | B62D 25/182 |
| | | | 454/162 |
| 2024/0109609 A1* | 4/2024 | Momii | B62D 37/02 |

\* cited by examiner

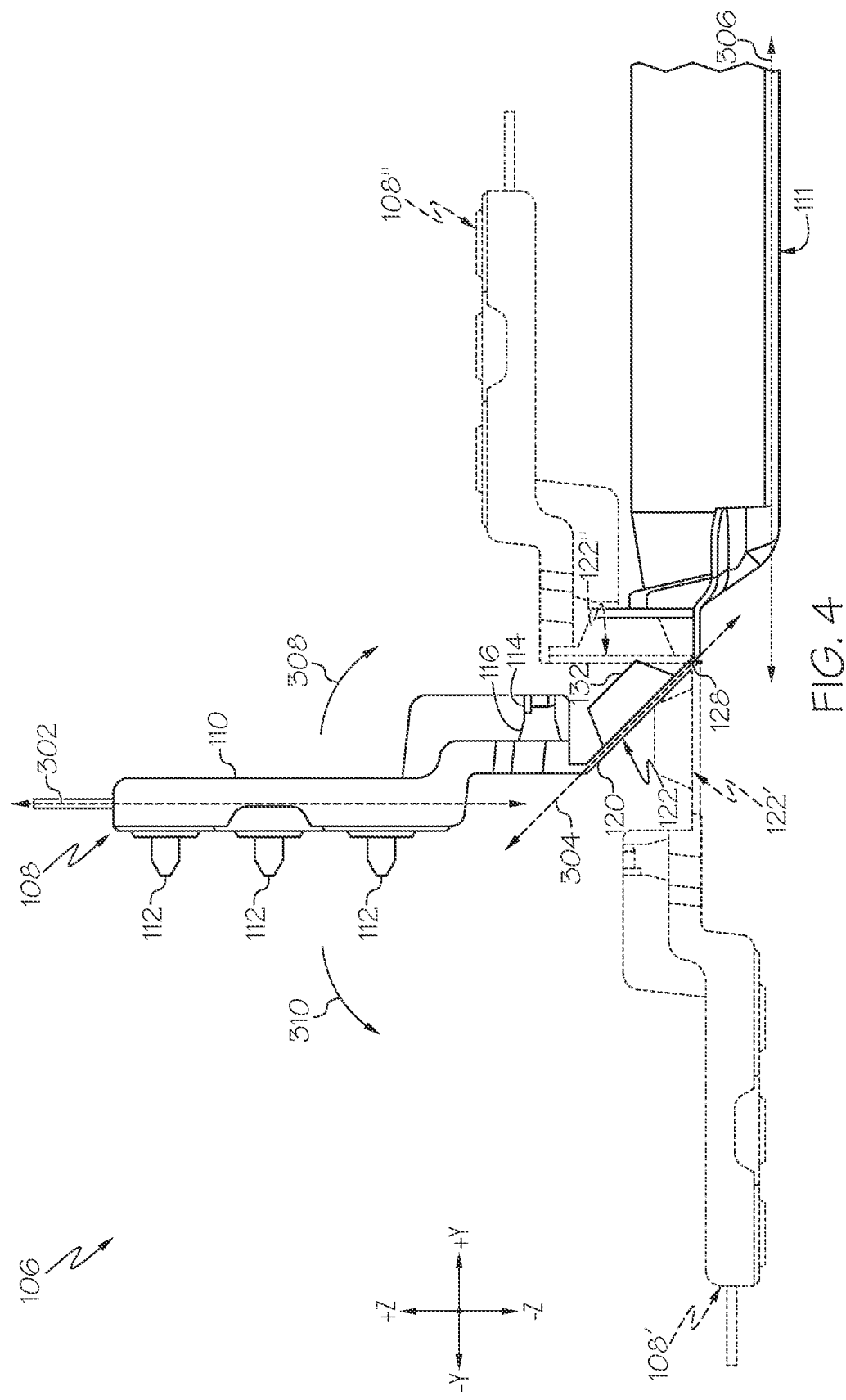

AIR GUIDES FOR VEHICLES

TECHNICAL FIELD

The present specification generally relates to air guides and, more specifically, air guides having a foldable configuration and a variable tolerance.

BACKGROUND

Conventional air guides may define stringent tolerances in order to be installed into a vehicle. These stringent tolerance may cause the component to be costly and difficult to install onto the vehicle. Additionally, conventional air guides may define large packaging sizes, which results in increased packaging costs.

Accordingly, a need exists for improved air guides that are easier to install onto a vehicle and have compact packaging sizes.

SUMMARY

In one embodiment, apparatus for an air guide for a vehicle having a pair of side members is disclosed. The air guide includes a base member having a pair of opposing ends and a pair of attachment members configured to be coupled to the pair of side members. Each of the pair of attachment members are coupled to a respective opposing end of the base member for movement between a folded position, an unfolded position, and an attachment position between the folded position and the unfolded position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 schematically depicts a side view of a portion of an air guide movable between a folded position, an unfolded position, and an attachment position, according to one or more embodiments shown and described herein.

DETAILED DESCRIPTION

Figure 1:
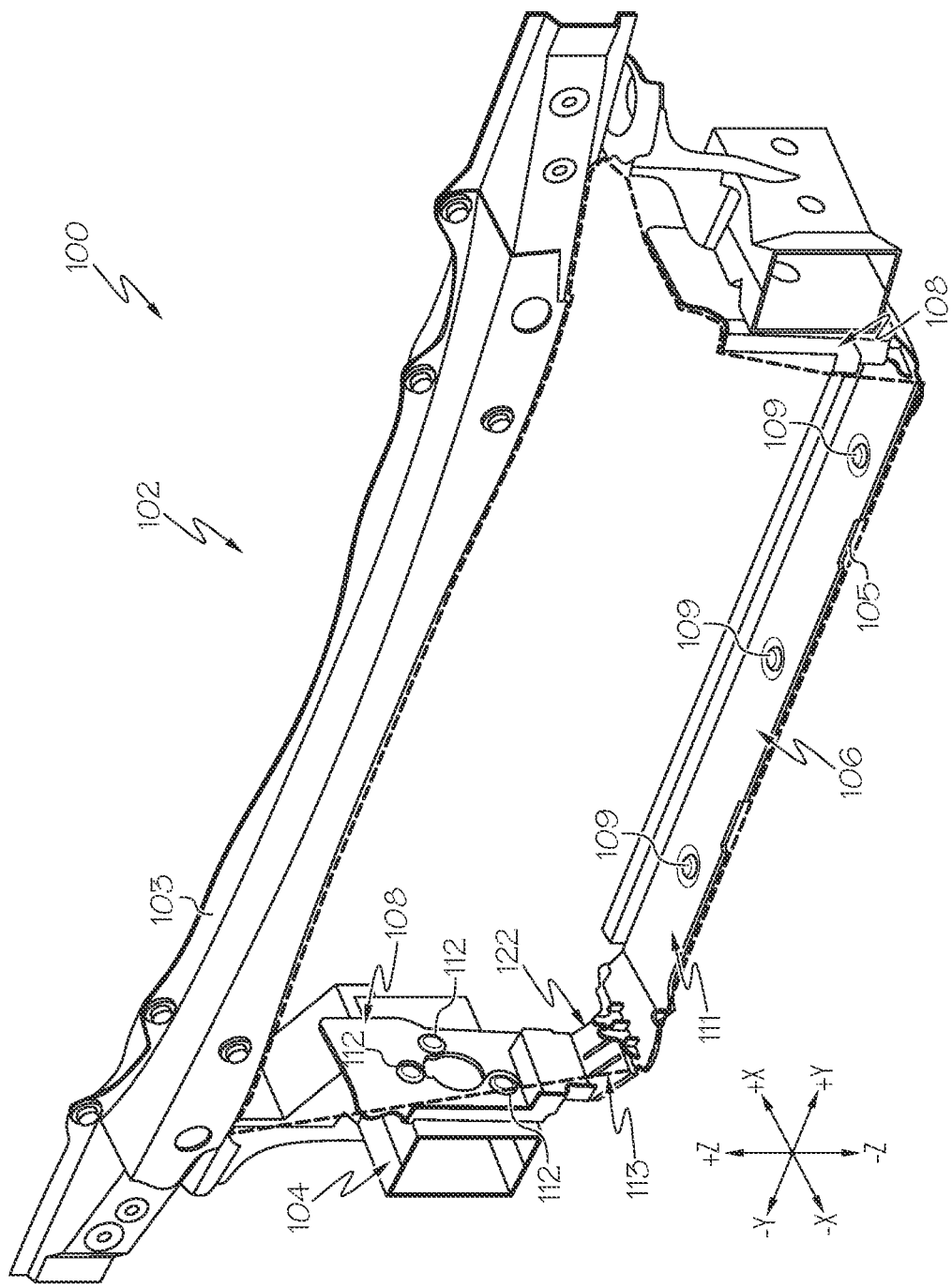
FIG. 1 schematically depicts a perspective view of an air guide in a vehicle, according to one or more embodiments shown and described herein.

Embodiments described herein are directed to an air guide for a vehicle having a base member and a pair of attachment members. The air guide is movable between a folded position, an unfolded position, and an attachment position between the folded position and the unfolded position. In the attachment position, the pair of attachment members are permitted to move relative to the base member, thereby allowing the air guide to be positionable before being coupled to side members of the vehicle. This allows for a simple installation process for the side members, less stringent tolerance requirements, and a robust system. In the folded position, the pair of attachment members are folded towards the base member and are inhibited from moving relative to the base member, thereby allowing for a compact packaging size. This results in a cost-effective packing solution.

Various embodiments of the apparatus and the operation of the apparatus are described in more detail herein. Whenever possible, the same reference numerals will be used throughout the drawings to refer to the same or like parts.

Referring now to FIG. 1, a vehicle 100 is illustrated according to one or more embodiments described herein. The vehicle 100 may generally include a frame skeleton 102 (e.g., chassis, frame member) and an air guide 106. The frame skeleton 102 provides the supporting structure of the vehicle 100 in which most other components (e.g., powertrain, differential, suspension) of the vehicle 100 are attached.

As used herein, the term "vehicle longitudinal direction" refers to the forward-rearward direction of the vehicle 100 (i.e., in the ±/−vehicle X direction depicted in FIG. 1). The term "vehicle lateral direction" refers to the width direction of the vehicle 100 (i.e., in the +/−vehicle Y direction depicted in FIG. 1), and is transverse to the vehicle longitudinal direction. The term "vehicle vertical direction" refers to the upward-downward direction of the vehicle 100 (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in direction with respect to a vehicle 100 centerline. The term "inboard" or "inward" as used herein refers to the relative location of a component in direction with respect to the vehicle 100 centerline. Because the vehicle 100 structures may be generally symmetrical about the vehicle centerline, the direction to which use of terms "inboard," "inward," "outboard" and "outward" may be mirrored about the vehicle 100 centerline when evaluating components positioned along opposite sides of the vehicle 100.

The frame skeleton 102 includes a top transverse bar 103, a pair of side members 104 and a bottom transverse bar 105. The pair of side members 104 are positioned, respectively, on a first side and a second side of the vehicle 100 and extend towards a front of the vehicle 100. In embodiments, the pair of side members 104 are integrated into the frame skeleton 102. In embodiments, the pair of side members 104 are coupled to the frame skeleton 102.

The top transverse bar 103 extends from the first side to the second side of the vehicle and is positioned above the pair of side members 104. The bottom transverse bar 105 extends from the first side to the second side of the vehicle and is positioned beneath the pair of side members 104.

The air guide 106 is positioned behind a front bumper of the vehicle 100. The air guide 106 includes a pair of attachment members 108 and a base member 111 having a pair of opposing ends. Each of the pair of attachment members 108 includes an intermediate wall 122 and an attachment wall 110. The pair of attachment members 108 are coupled to a respective opposing end of the base member 111. As discussed in greater detail herein, the pair of attachment members 108, specifically, the attachment walls 110 and the intermediate walls 122, and the base member 111 co-operate to facilitate movement of the air guide 106 between a folded position, an unfolded position, and an attachment position. Further the pair of attachment members 108, specifically, the attachment walls 110 and the intermediate walls 122, and the base member 111 co-operate to permit movement of the pair of attachment members 108 and the intermediate wall 122 relative to the base member 111, thereby defining a simple installation process to the side members 104.

Figure 2:
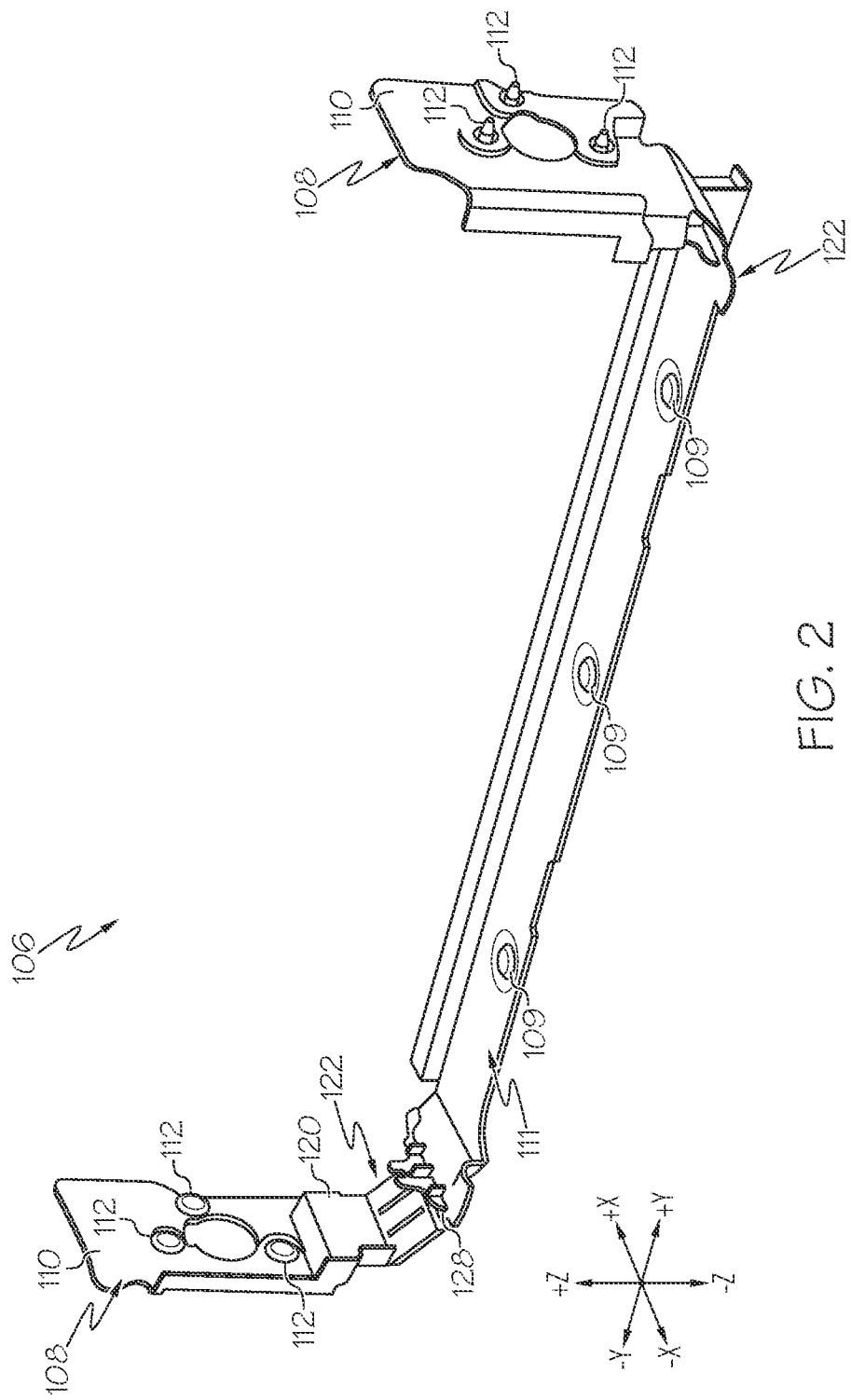
FIG. 2 schematically depicts a perspective view of an air guide, according to one or more embodiments shown and described herein.
Figure 3:
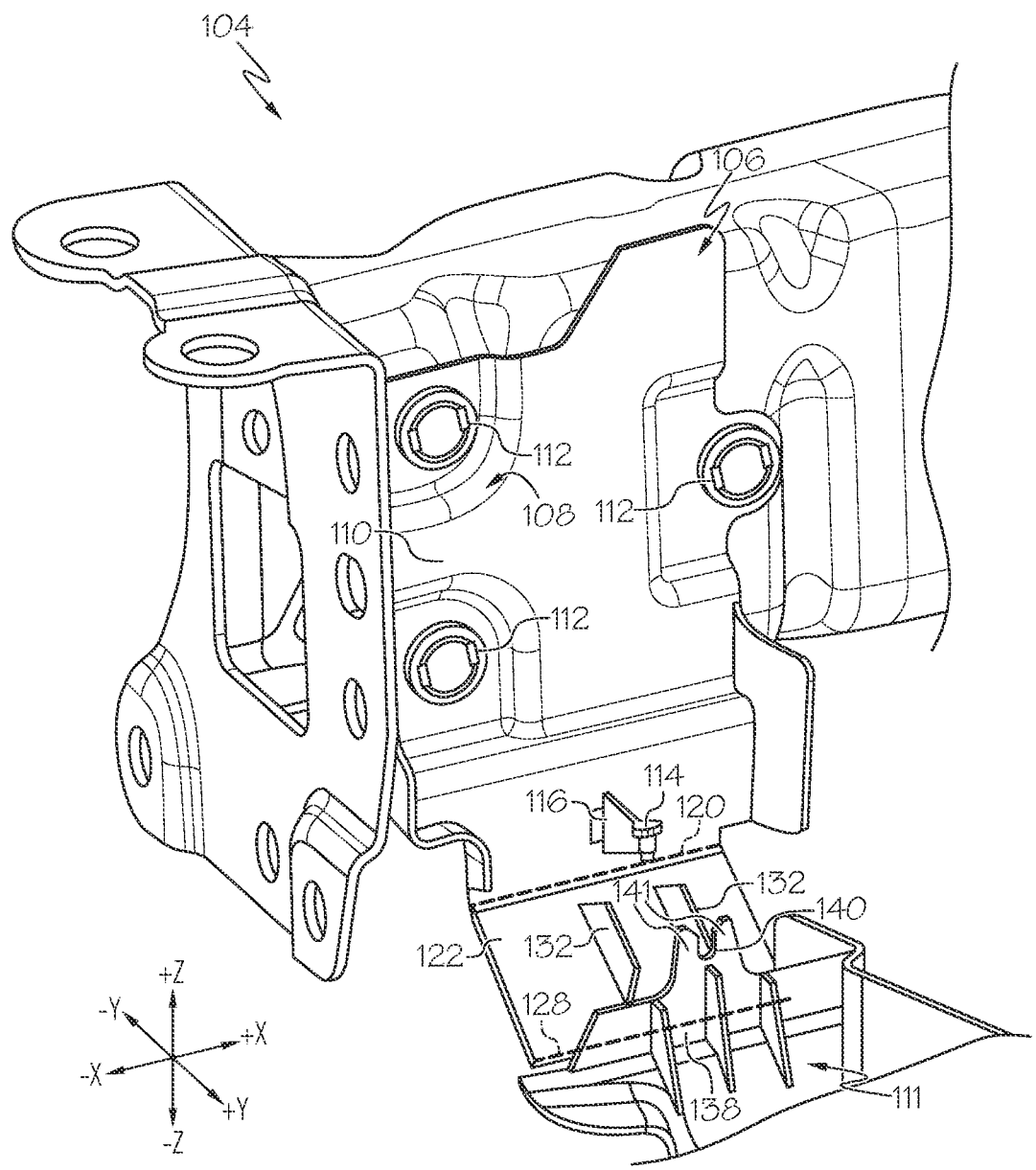
FIG. 3 schematically depicts a perspective view of a portion of an air guide on a vehicle, according to one or more embodiments shown and described herein.

In the attachment position of the air guide 106, as shown in FIGS. 1-3, each of the pair of attachment members 108, specifically, the attachment walls 110 are coupled to a respective side of the pair of side members 104 via a plurality of attachment fasteners 112. Each of the pair of attachment members 108 may be moved relative to its respective side of the pair of side members 104 prior to fastening the plurality of attachment fasteners 112. This is advantageous as it allows for less rigid tolerance and improved robustness of the air guide 106 as compared to conventional approaches.

In some embodiments, the base member 111 is coupled to the bottom transverse bar 105 via a plurality of base fasteners 109. In some embodiments, the base member 111 is uncoupled from the bottom transverse bar 105 such that the base member 111 is permitted to move with respect to the bottom transverse bar 105. The individual components of the air guide 106 and the top transverse bar 103 co-operate to define an airflow inlet 113. The airflow inlet 113 is configured to receive an air flow from the front of the vehicle 100 and to direct the air flow to an engine bay of the vehicle 100. In embodiments, the airflow inlet 113 is configured to direct air flow to a condenser, an engine cooling module, and/or a radiator side of the engine bay.

Referring now to FIG. 2, a perspective view of the air guide 106 is shown in the attachment position, according to various embodiments. Each of the pair of attachment members 108 may include an attachment wall 110. As depicted, each of the attachment walls 110 are planar surfaces, however, other geometries are contemplated and possible (e.g., curved, angled). Each of the attachment walls 110 are configured to be coupled to a respective side member of the pair of side members 104.

The air guide 106 may include a first living hinge 120 positioned between each attachment wall 110 and each intermediate wall 122. The first living hinge 120 hingedly couples rotatably couples) the attachment wall 110 and the intermediate wall 122, thereby facilitating for the attachment wall 110 to rotate relative to the intermediate wall 122, and vice versa.

The air guide 106 may also include a second living hinge 128 positioned between each intermediate wall 122 and the base member 111. The second living hinge 128 hingedly, couples the intermediate wall 122 and the base member 111, thereby facilitating for the attachment member 108 and the intermediate wall 122 to rotate relative to the base member 111 and vice versa.

Referring now to FIG. 3, a perspective view of a first side of the air guide 106 attached to a side member of the pair of side members 104 is shown, according to various embodiments. The base member 111 may include a first connection member 138 extending outwardly from a surface of the base member 111. As depicted, the first connection member 138 is a planar surface, however, other geometries are contemplated and possible (e.g., curved, angled). In embodiments, the first connection member 138 defines an aperture 140 (e.g., void).

In embodiments, the aperture 140 is a keyed slot and includes an opening that is flanked by a pair of inwardly tapering flanges 141. The diameter of the inwardly tapering flanges 141 define a diameter that is smaller in size than a diameter defined by the opening. During insertion of a second connection member 114 into the aperture 140, the flanges 141 flex outwardly, such that the second connection member 114 is received within the opening and is then retained by the flanges 141 until the second connection member 114 is removed.

Each of the pair of attachment members 108 may include the second connection member 114 extending away from a surface of each of the pair of attachment members 108. In the folded position of the air guide 106, the second connection member 114 is configured to be sized and shaped to receive the first connection member 138. As depicted, the second connection member 114 is a pin positioned on an end of an extruded member 116. The pin is configured to be received with the aperture 140 of the first connection member 138. However, any suitable removable coupling mechanism may instead be utilized (e.g., such as a bolt and nut, bolt and a threaded hole, etc.). When the second connection member 114 is engaged with the first connection member 138 the attachment member 108 becomes coupled to the base member 111, thereby inhibiting movement of the attachment member 108 to the base member 111. Further, due to the intermediate wall 122 being hingedly coupled to the attachment member 108 and being hingedly, coupled to the base member 111, the intermediate wall 122 is also then inhibited from moving relative to the base member 111.

When the second connection member 114 is disengaged from the first connection member 138, the attachment member 108 becomes uncoupled to the base member 111, thereby permitting movement of the attachment member 108 relative to the base member 111. Further, due to the intermediate wall 122 being hingedly coupled to the attachment member 108 and hingedly coupled to the base member 111, permitting the intermediate wall 122 to move relative to the base member 111.

In embodiments, the first connection member 138 may be a pin and the second connection member 114 defines an aperture 140 sized and shaped to receive the pin. As shown in FIG. 4, in the folded position, the second connection member 114" is engaged (e.g., inserted) into the first connection member 138, thereby removably coupling the first connection member 138 to the second connection member 114". Accordingly, each of the attachment members 108 are then removably coupled to the base member 111, In this way, each of the attachment members 108 are inhibited from moving relative to the base member 111. The removable connection provides the air guide 106 to be folded into a compact size during the shipping and handling of the air guide 106.

The intermediate wall 122 may include a stopper 132 extending from a surface of the intermediate wall 122. In the folded position, edged surfaces of the stopper 132 make contact (e.g., abuts) to both the top surface of the base member 111 and the top surface of each of the attachment members 108. In this way, the stopper 132 is configured to prevent each of the attachment members 108 from rotating beyond a predetermined amount when in the folded position.

Referring now to FIG. 4, a side view of the air guide 106 is shown, according to various embodiments. FIG. 4 illustrates the air guide 106 in the attachment position with solid lines for the intermediate wall 122 and the attachment member 108. FIG. 4 also illustrates the air guide 106 in the unfolded position with dashed lines for the intermediate wall 122' and the attachment member 108'. Additionally, FIG. 4 also illustrates the air guide 106 in the folded position with dashed lines for the intermediate wall 122" and the attachment member 108". The air guide 106 is movable between the folded position, the unfolded position, and the attachment position. Each of the attachment members 108 defines a first axis 302 along a length of the each of the attachment members 108. Each of the intermediate walls 122 defines a second axis 304 along a length of each of the intermediate walls 122. The base member 111 defines a third axis 306 along a length of the base member 111.

In the attachment position, each of the pair of attachment members 108 are positioned such that the first axis 302 is generally orthogonal to the third axis 306. Accordingly, each of the pair of attachment members 108 are then generally oriented orthogonal to the base member 111. Also in the attachment position, the intermediate wall 122 is positioned such that the second axis 304 is generally oblique to the third axis 306. Accordingly, the intermediate wall 122 is generally oriented oblique to the base member 111. In this way, each of the pair of attachment members 108, the intermediate wall 122, and the base member 111 may be adjusted prior to coupling each of the pair of attachment members 108 to the of side members 104 and the base member 111 to the bottom transverse bar 105. The air guide 106 may be placed in the attachment position to install the air guide 106 onto the frame skeleton 102. The attachment positions allows for each of the attachment members 108 to be movable to improve the installation of the air guide 106 onto the frame skeleton 102. The attachment position is between the unfolded position and the folded position.

In the folded position, each of the pair of attachment members 108" are rotated in a first direction 308 such that a front surface of each of the pair of attachment members 108" is exposed to a front surface of the base member 111. In the folded position, the first axis 302 is generally parallel to the third axis 306. Also in the folded position, the intermediate wall 122" is positioned such that the second axis 304 is generally not straight to the third axis 306. Accordingly, the intermediate wall 122" is generally not straight to the base member 111. In this way, the air guide 106 defines a compact shape and size for packaging when in the folded position. The air guide 106 may be placed in the folded position to place the air guide 106 in a packaging position. In this way, the air guide 106 defines a more compact design to reduce packaging costs.

In embodiments, in the folded position, the stopper 132 is configured to contact (e.g., abut) the first connection member 138 after the intermediate wall 122" has rotated in the first direction 308 by a predetermined amount. In this way, the stopper 132 prevents each of the pair of attachment members 108" from rotating more than the predetermined amount. This is advantageous by causing the air guide 106 to define a more robust design in the folded position.

In the unfolded position, each of the pair of attachment members 108 is rotated in a second direction 310, opposite of the first direction 308, such that the first axis 302 is generally parallel to the third axis 306. Accordingly, each of the pair of attachment members 108' are generally parallel to the base member 111. Also in the unfolded position, the intermediate wall 122' is positioned such that the second axis 304 is generally parallel to the third axis 306. Accordingly, the intermediate wall 122' is generally parallel to the base member 111. In this way, the air guide 106 may define a substantially flat profile in the unfolded position. This may be advantageous during the manufacturing of the air guide 106 via molding, forming, etc. and for storing the air guide 106. For example, the unfolded position is the position defined by the air guide 106 during molding. During the molding process, at least the attachment members', the intermediate wall 122', the base member 111, the first living hinge 120, and the second living hinge 128 are integrally molded and formed as one monolithic structure.

From the above, it is to be appreciated that defined herein is an air guide for a vehicle having a base member and a pair of attachment members. The air guide is movable between a folded position, an unfolded position, and an attachment position. In the attachment position, the pair of attachment members are able to move relative to the base member, thereby allowing the air guide to be positionable before being coupled to side members of the vehicle. This allows for a simple installation process for the side members, less stringent tolerance requirements, and a robust system. In the folded position, the pair of attachment members are folded towards the base member and are inhibited from moving relative to the base member, thereby allowing for a compact packaging size. This results in a cost-effective packing solution.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed:

1. An air guide for a vehicle having a pair of side members, the air guide comprising:
  a base member having a pair of opposing ends; and
  a pair of attachment members configured to be coupled to the pair of side members, each of the pair of attachment members are coupled to a respective opposing end of the base member for movement between a folded position in which each of the pair of attachment members extend toward one another overlapping the base member, an unfolded position in which each of the pair of attachment members extend away from one another and define a flat profile with the base member, and an attachment position between the folded position and the unfolded position.

2. The air guide of claim 1, wherein in the folded position each of the attachment members are coupled to the base member to inhibit movement of each of the attachment members relative to the base member.

3. The air guide of claim 2, wherein in the unfolded position and in the attachment position the attachment members are permitted to move relative to the base member.

4. The air guide of claim 3, wherein each of the attachment members includes an attachment wall configured to be coupled to a respective side member and an intermediate wall hingedly coupled between the attachment wall and the base member.

5. The air guide of claim 4, further comprising:
a first connection member disposed on the base member; and
a second connection member disposed on the attachment wall.

6. The air guide of claim 5, wherein the first connection member is configured to be shaped and sized to receive the second connection member in the folded position.

7. The air guide of claim 6, wherein the intermediate wall is:
hingedly coupled to the attachment wall via a first living hinge; and
hingedly coupled to the base member via a second living hinge.

8. The air guide of claim 7, wherein in the attachment position:
the base member defines a first axis along a length of the base member;
the intermediate wall defines a second axis along a length of the intermediate wall, the second axis being generally oblique to the first axis; and
the attachment wall defines a third axis along a length of the attachment wall, the third axis being generally orthogonal to the first axis.

9. The air guide of claim 8, wherein in the unfolded position:
the second axis is generally parallel to the first axis; and
the third axis is generally parallel to the first axis.

10. The air guide of claim 9, wherein in the attachment position:
the pair of attachment members are coupled to the pair of side members; and
the base member is permitted to move relative to the attachment members due to the attachment wall being hingedly coupled to the intermediate wall via the first living hinge and the intermediate wall being hingedly coupled to the base member via the second living hinge.

11. An air guide for a vehicle having a pair of side members, the air guide comprising:
a base member having a pair of opposing ends; and
a pair of attachment members configured to be coupled to the pair of side members, each of the pair of attachment members are coupled to a respective opposing end of the base member for movement between a folded position, an unfolded position, and an attachment position between the folded position and the unfolded position, wherein in the folded position each of the attachment members are coupled to the base member to inhibit movement of each of the attachment members relative to the base member.

12. The air guide of claim 11, wherein in the unfolded position and in the attachment position the attachment members are permitted to move relative to the base member.

13. The air guide of claim 12, wherein each of the attachment members includes an attachment wall configured to be coupled to a respective side member and an intermediate wall hingedly coupled between the attachment wall and the base member.

14. The air guide of claim 13, further comprising:
a first connection member disposed on the base member; and
a second connection member disposed on the attachment wall.

15. The air guide of claim 14, wherein the first connection member is configured to be shaped and sized to receive the second connection member in the folded position.

16. The air guide of claim 15, wherein the intermediate wall is:
hingedly coupled to the attachment wall via a first living hinge; and
hingedly coupled to the base member via a second living hinge.

17. The air guide of claim 16, wherein in the attachment position:
the base member defines a first axis along a length of the base member;
the intermediate wall defines a second axis along a length of the intermediate wall, the second axis being generally oblique to the first axis; and
the attachment wall defines a third axis along a length of the attachment wall, the third axis being generally orthogonal to the first axis.

18. The air guide of claim 17, wherein in the unfolded position:
the second axis is generally parallel to the first axis; and
the third axis is generally parallel to the first axis.

19. The air guide of claim 18, wherein in the attachment position:
the pair of attachment members are coupled to the pair of side members; and
the base member is permitted to move relative to the attachment members due to the attachment wall being hingedly coupled to the intermediate wall via the first living hinge and the intermediate wall being hingedly coupled to the base member via the second living hinge.

* * * * *